May 5, 1964 C. E. VANDENBERG 3,131,533
AFTERBURNER AND METHOD FOR PURIFYING POLLUTED EXHAUST GASES
Filed Feb. 13, 1961 8 Sheets-Sheet 1

INVENTOR.
CORNELIUS E. VANDENBERG
BY Thomas S. MacDonald
ATTORNEY

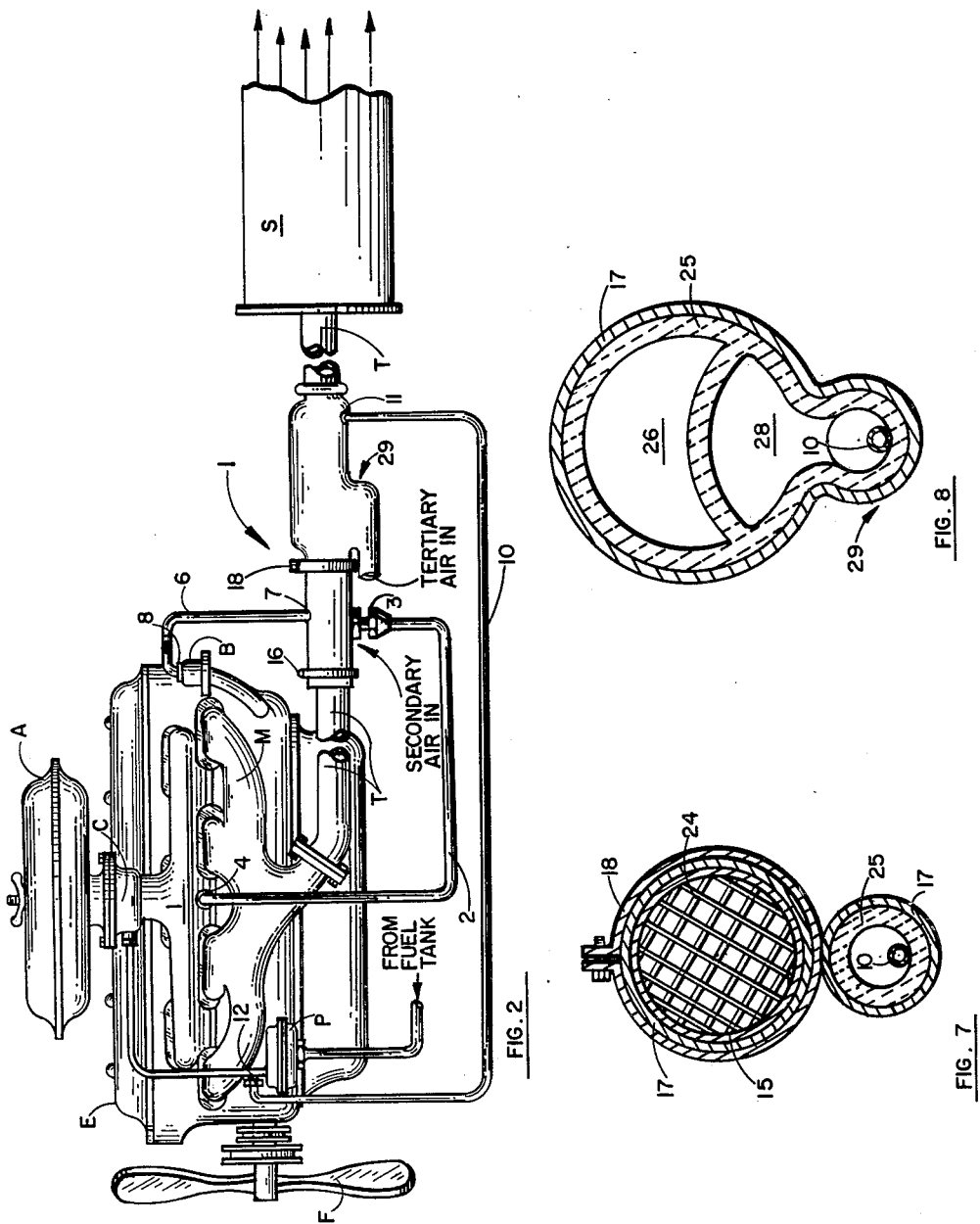

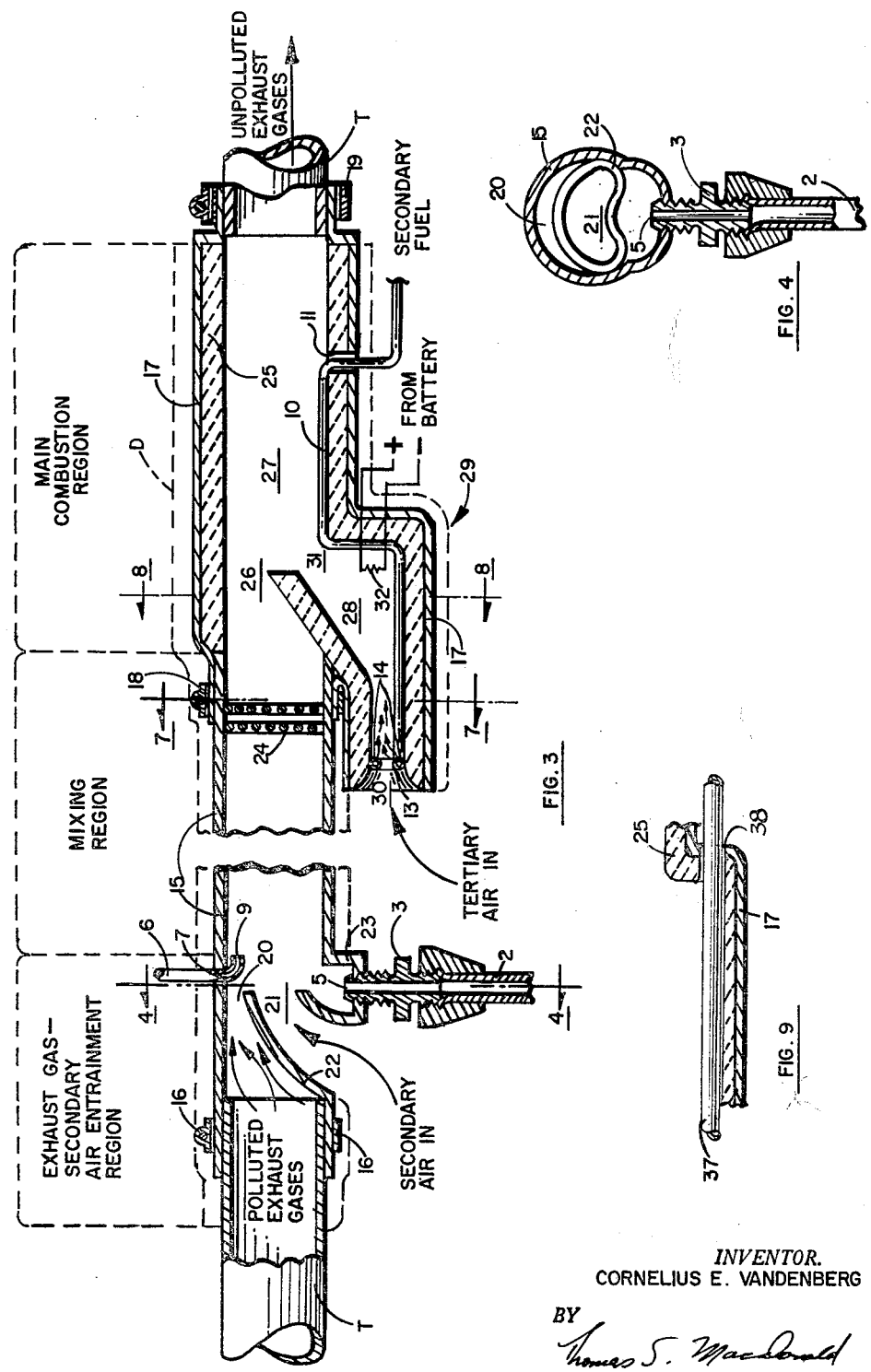

May 5, 1964 C. E. VANDENBERG 3,131,533
AFTERBURNER AND METHOD FOR PURIFYING POLLUTED EXHAUST GASES
Filed Feb. 13, 1961 8 Sheets-Sheet 5

*INVENTOR.*
CORNELIUS E. VANDENBERG

BY
Thomas S. MacDonald

ATTORNEY

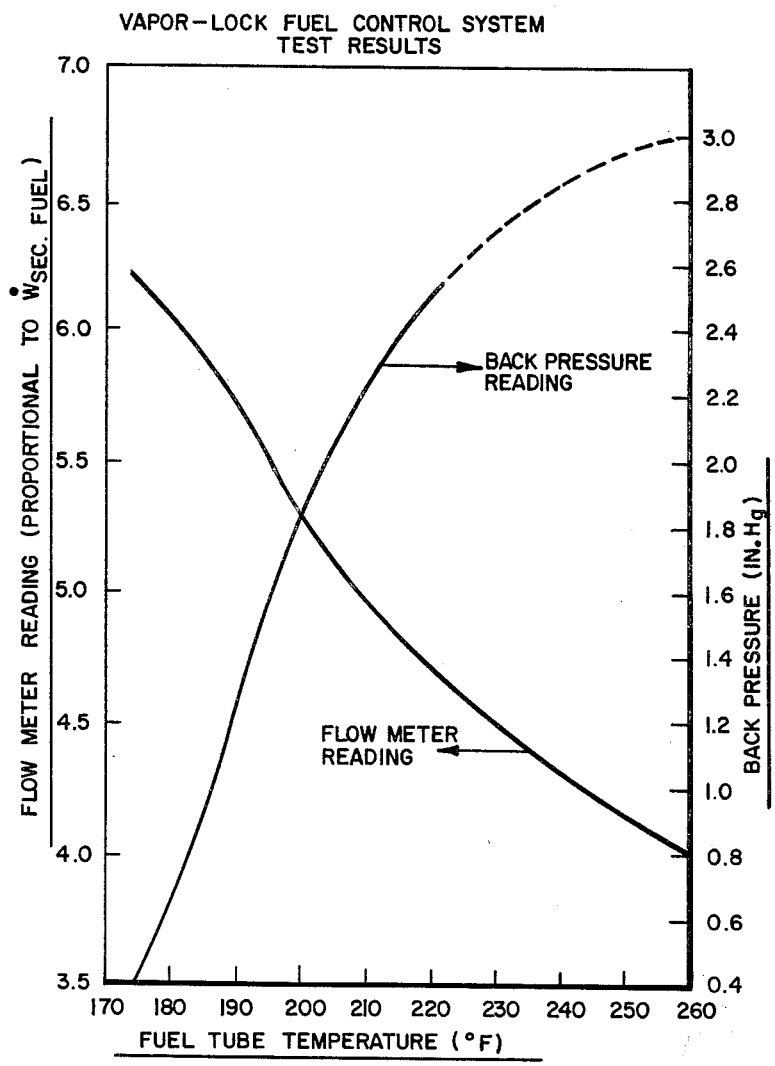
FIG. II

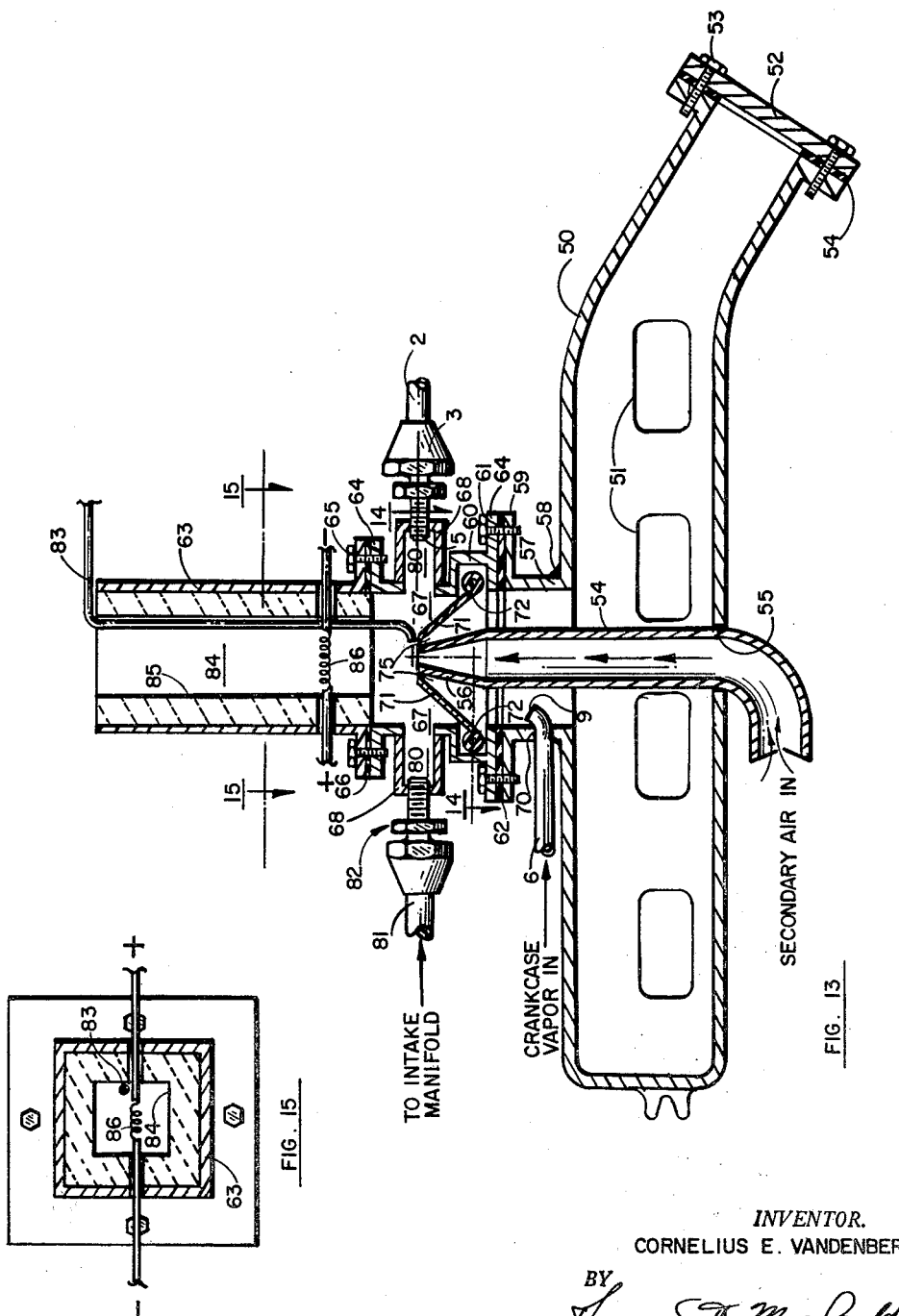

United States Patent Office 3,131,533
Patented May 5, 1964

3,131,533
AFTERBURNER AND METHOD FOR PURIFYING
POLLUTED EXHAUST GASES
Cornelius Edward Vandenberg, Fullerton, Calif.,
assignor to North American Aviation, Inc.
Filed Feb. 13, 1961, Ser. No. 88,715
15 Claims. (Cl. 60—30)

This invention relates to an afterburner and method for purifying polluted exhaust gases and more particularly relates to the automatically controlled reduction of motor vehicle exhaust contaminants.

The growing problem of air pollution, particularly in large cities, has provided the impetus for research and development efforts in the field of internal combustion engines. It is generally agreed that such air pollution is primarily caused by the relatively large proportions of unoxidized and partially oxidized carbons and hydrocarbons and nitrogen oxides some of which are believed to react photo-chemically to form what has come to be known as "smog." It has been further determined by the Los Angeles Air Pollution Control District, for example, that the primary source thereof are the polluted motor vehicle exhaust gases which add approximately 65% of all hydrocarbons and approximately 60% of all nitrogen oxides found therein. The overall undesirable effects of such "smog" primarily comprises eye, nose, throat and lung irritations, reduced visibility and damage to certain sensitive crops.

Many prior art methods and devices have been proposed to cope with such a problem. Such methods and included hardware generally comprise fuel modifiers, deceleration fuel shut-off devices, vacuum breakers and vacuum limiters, oxygen and ozone air supply enrichment devices, fuel atomizers and vaporizers, carburetor isolating valves, exhaust recirculators, engine design changes and exhaust control devices. The exhaust control device category primarily comprises exhaust gas purifiers and exhaust gas afterburners, of the catalytic and direct flame type, respectively. Many organizations, including the Los Angeles Air Pollution Control District, have concluded that afterburning proposes the most feasibile solution to the above stated problem.

Many state-of-the-art afterburning devices have been proposed, such as the Apparatus for Consuming the Unburned Products of Combustion of an Internal Combustion Engine disclosed in Patent No. 2,851,852. However, such devices are generally complex in nature and therefore, are relatively high in cost. Furthermore, many of the prior art devices are dependent in their operation on pumps, diaphragms and other movable type elements which elements are susceptible to damage and often cause a malfunction of the afterburner.

The present invention overcomes many of the inadequacies of the prior art by providing a novel afterburning concept particularly usable with conventional internal combustion type engines. Such conventional type engines necessarily include an intake manifold adapted to receive primary air in accordance with the varying pressures occasioned therein by the performance of said engine. Such engine performance will be hereinafter alternatively noted as the output thereof. Such an output may conveniently comprise such performance parameters as revolutions per minute, torque, horsepower, etc.

The afterburner of this invention essentially comprises a control means for receiving polluted or contaminated combustion exhaust gases from said engine therein and for automatically inducing and discharging predetermined amounts of secondary air into said combustion gases to form a combustible primary mixture of desired proportions. One of the novel aspects of this invention comprises the utilization of regulating means constructed and arranged to operatively connect said intake manifold and said afterburner adjacent to said control means so as to directly vary the pressure therearound in accordance with the pressures prevalent in said intake manifold. Thus, during predetermined critical stages of engine operation, the secondary air is selectively and continuously induced and mixed with said exhaust gases in accordance with the output and design of said engine. The afterburner further comprises a novel combustion means concept for continuosuly and efficiently burning the exhaust gas-secondary air mixture. Such a combustion means includes a novel preburning means for automatically insuring a pre-burning medium having a sufficiently high energy to assure complete combustion of said mixture during all phases of engine operation.

An object of this invention is to provide an afterburner and method for efficiently and continuously purifying polluted exhaust gases discharged from an internal combustion type engine during all operational stages thereof.

Another object of this invention is to provide an afterburner device having simplicity of design and durability of construction.

A further object of this invention is to provide an afterburner device which is substantially void of moving parts.

A still further object of this invention is to provide an afterburner which automatically assures to itself a combustible mixture during all operational stages of an internal combustion type engine.

A still further object of this invention is to provide an afterburner having a fail-safe precombustion means for automatically assuring a sufficiently high energy addition to the burned mixture to assure complete combustion thereof during all operation stages of an internal combustion type engine.

These and other objects of this invention will become apparent from the following description taken in connection with the accompanying drawings, in which:

FIG. 1 is a schematic operational showing of a preferred afterburner embodiment and internal combustion engine combination employing the novel concepts of this invention.

FIG. 2 discloses a side elevational view of an internal combustion engine of the conventional type operatively connected to a preferred afterburner embodiment.

FIG. 3 is a longitudinal cross-sectional view of the afterburner embodiment of FIG. 2.

FIG. 4 is a cross-sectional view taken on lines 4—4 of FIG. 3.

FIG. 7 is a cross-sectional view taken on lines 7—7 of FIG. 3.

FIG. 8 is a cross-sectional view taken on lines 8—8 of FIG. 3.

FIG. 9 is a partial cross-sectional view disclosing an alternative secondary fuel-conduit arrangement.

FIG. 11 is a graphical representation of the performance of a vapor-lock secondary fuel control.

FIG. 13 is a longitudinal cross-sectional view of the afterburner embodiment of FIG. 12 taken on lines 13—13 thereof.

FIG. 15 is a cross-sectional view taken on lines 15—15 of FIG. 13.

The primary purpose of this invention is to provide an afterburner and method for efficiently oxidizing exhaust gases polluted with partially oxidized and unoxidized carbons and hydrocarbons which are discharged from an internal combustion type engine. The afterburner is operatively connected to said engine downstream thereof and is adapted to receive the discharged polluted exhaust gases therefrom. The afterburner includes a control means for receiving said polluted exhaust gases directly from the engine, for inducing contaminated vapors in the form of gases from a crankcase of said engine and for inducing predetermined amounts of secondary air therein. A combustible primary mixture of predetermined proportions is thus automatically and continuously provided during the majority of operational phases of the engine. The control means essentially comprises a restricted throat portion for inducing the flow of said gases therein, a necked-in member constructed and arranged to provide an opening facing downstream for inducing secondary air therein and regulating means operatively connected to an intake manifold of said engine. The regulating means terminates adjacent to the opening formed in said necked-in member for directly and continuously varying the pressure therearound in accordance with the pressures prevalent in said intake manifold. The regulating means functions to assure sufficient secondary air during critical phases of engine operation. A combustion means is provided downstream of said entraining means for efficiently burning said primary mixture. Preburning means are included in said combustion means for receiving, mixing and igniting a tertiary air-secondary fuel mixture (secondary mixture) for automatically assuring a preburning medium having a sufficiently high energy to assure complete combustion of said primary mixture during all phases of engine operation. A fuel addition means is provided in said preburning means for automatically supplying predetermined quantities of fuel for said secondary mixture in accordance with the temperature generated when said primary and/or secondary mixtures are burned. A vapor-lock means is provided in the fuel addition means and functions to automatically substantially stop the flow of fuel therein when a predetermined temperature level is reached due to the burning of the primary and/or secondary mixtures. The product which is finally discharged from the afterburner comprises a substantially unpolluted exhaust gas.

Figure 1:
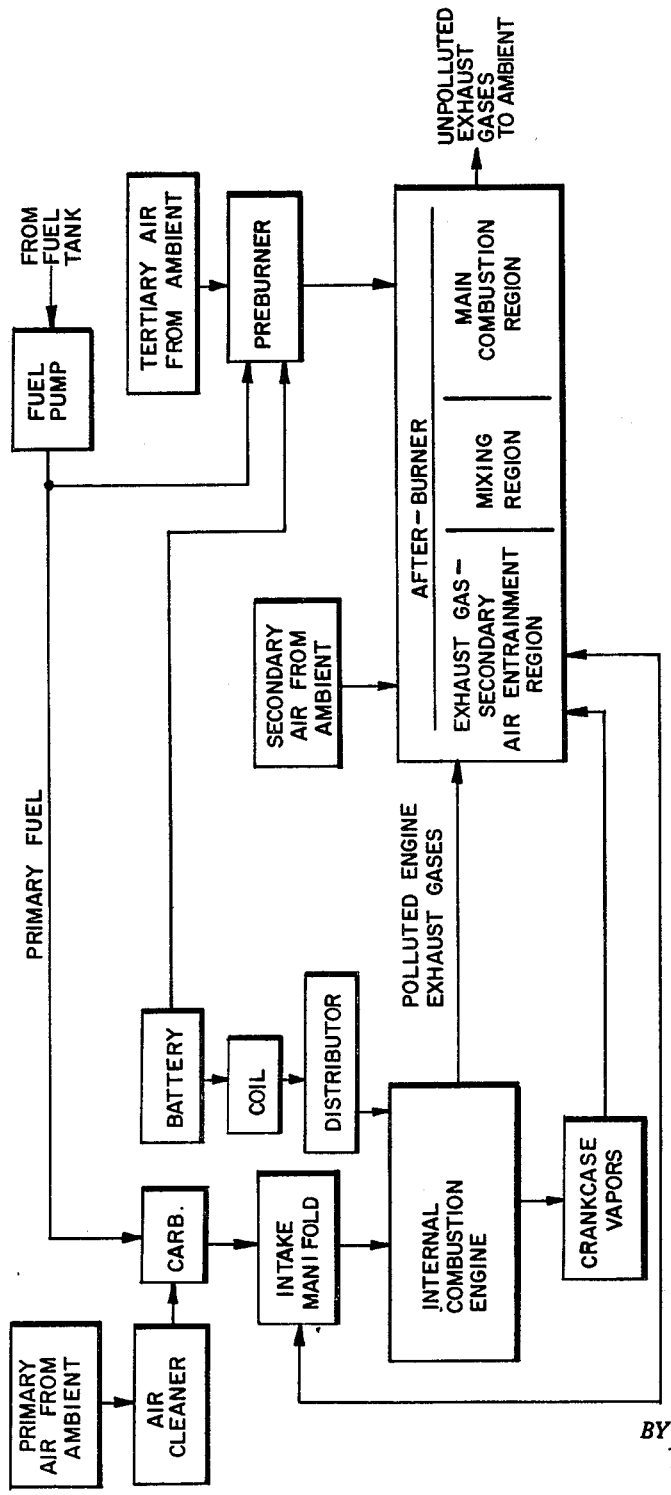

FIG. 1 is a schematic illustration of the basic operational workings of applicant's afterburner concepts as they would appear in combination with an internal combustion engine of the conventional type. As shown, such an internal combustion type engine is adapted to be operatively connected to an afterburner so as to discharge polluted exhaust gases and gaseous crankcase vapors therein. The afterburner essentially comprises three distinct regions: (1) an "Exhaust Gas-Secondary Air Entrainment Region," (2) a "Mixing Region," and (3) a "Main Combustion Region." A preburner is preferably formed as an integral part of the afterburner and cooperates with the "Main Combustion Region" thereof for purposes hereinafter set forth.

A fuel pump functions to receive fuel in the form of gasoline from a fuel tank, for example, and pumps predetermined amounts of such fuel to the engine and lesser predetermined amounts to the preburner. A battery is operatively connected to the engine in the conventional manner and also to the afterburner to supply electrical power thereto for purposes hereinafter more fully explained. An intake manifold of the conventional type is operatively connected to the internal combustion engine and is further operatively connected to a carburetor which is adapted to receive primary air therein so as to provide an efficient fuel-air mixture during all phases of engine operation.

The intake manifold is further operatively connected to the afterburner and is adapted to control the induction of secondary air therein as will be hereinafter more fully explained. Tertiary air is induced into the preburner and combines with predetermined amounts of said secondary fuel to provide for a preburning mixture which is ignited by a relatively small amount of electrical energy generated by the battery. After the polluted exhaust gases from the internal combustion engine and the polluted vapors from the crankcase are mixed with predetermined amounts of secondary air, such a primary mixture is efficiently burned and the end product which is discharged into ambient substantially comprises an unpolluted exhaust gas.

FIG. 2 illustrates an afterburner embodiment generally noted at 1 employing the novel concepts of this invention. The afterburner 1 is shown as it would appear in combination with a conventional engine E. The engine is preferably of the internal combustion type capable of producing a variable output during the idle, slow cruise, medium cruse, fast cruise and sudden deceleration phases of engine operation. A standard air cleaner A is exposed to the ambient environment and functions to receive and substantially clean primary air which is induced therein. Such primary air is subsequently transmitted to a carburetor C which functions to assure an efficient fuel-air mixture for the engine in the conventional manner. The induction of primary air, during all modes of engine operation, is made through a standard intake manifold I.

The intake manifold I is operatively connected to said internal combustion engine in the conventional manner and functions to continuously guide primary air and fuel into the engine in accordance with the pressures occasioned therein, primarily dependent on the selectively varied output of said engine. An exhaust manifold M is operatively connected downstream of the engine E in the conventional manner and functions to receive and discharge polluted exhaust gases into the extreme upstream portion of a standard tail pipe T. For illustration purposes, only one exhaust manifold has been shown. However, should the afterburner of this invention be utilized with an engine having a dual exhaust system, for example, it should be understood that individual afterburner units may be utilized therewith, or in the alternative, such dual exhaust manifolds may be operatively connected to a single afterburner unit.

The afterburner 1 is operatively connected to the internal combustion engine downstream thereof and is adapted to receive polluted or contaminated exhaust gases therefrom. A conventional muffler may be constructed and arranged downstream of said afterburner and cooperates therewith to receive and discharge unpolluted exhaust gases therefrom. A first conduit or tubing 2 is operatively connected at a first end thereof to a first side wall portion of the afterburner by means of a standard fitting 3. The conduit 2 is further operatively connected by means of a standard fitting 4 to the intake manifold I at a second end thereof.

A second conduit or tubing 6 is also operatively connected to the afterburner and projects through an aperture 7 formed in a second side wall portion thereof, which portion is preferably substantially juxtaposed to the first side wall portion of said afterburner whereat the first conduit 2 terminates. The second conduit 6 is further operatively connected to a conventional crankcase breather cap B of the engine by means of a standard fitting 8. Certain engine system designs further include a crankcase breather line in addition to the crankcase breather cap. In such constructions, it is generally desirable to plug such an additional line to fully promote the hereinafter more fully explained desired functions.

A third conduit 10 is operatively associated with the afterburner and projects through an aperture 11 formed in a third side wall portion thereof, downstream of said first and second afterburner side wall portions. If so desired, a standard fitting may be readily utilized to provide an afterburner connection for the second and third conduits 6 and 10, respectively. However, in most applications a substantial press-fit type structural relationship between the conduits 6 and 10 and the respective apertures 7 and 11 of the afterburner is sufficient. The third conduit 10 is further operatively connected by a standard fitting 12 to the main fuel line of the fuel pump P of the engine, as shown. The specific functions of the above discussed conduit members will be hereinafter more fully explained.

FIG. 3 more fully discloses the novel structural and operational features of the afterburner embodiment of FIG. 2. As hereinbefore stated, the afterburning system essentially comprises three distinct regions: (1) the "Exhuast Gas-Secondary Air Entrainment Region"; (2) the "Mixing Region"; and (3) the "Main Combustion Region." It should be understood that the first region may be alternatively termed the "Exhaust Gas-Crankcase Vapor-Secondary Air Entrainment Region." However, since the crankcase vapors comprise a relatively small portion of such a primary mixture, for explanation purposes the first region will be hereinafter termed as the "Exhaust Gas-Secondary Air Entrainment Region." As will be hereinafter more fully explained, the novel concepts of this invention provide that such regions may be selectively positioned at any desired relative distance from each other without substantially affecting the overall operational efficiency thereof. For example, the "Exhaust Gas-Secondary Air Entrainment Region" could be located closely adjacent or formed integral with the exhaust manifold M and the "Main Combustion Region" could be constructed and arranged at the extreme downstream portion of a tail pipe T of the automobile at either side of the muffler S (FIG. 2). The intermediate section would then comprise the "Mixing Region." The only basic requirement is that such regions be constructed and arranged in sequential order, i.e., entrainment, mixing and combustion.

Regarding the following discussion, it should be particularly noted that the system is substantially void of moving parts and as such represents a significant advance in reliability and low manufacturing cost over existing and proposed exhaust gas afterburner systems.

As shown in FIG. 3, the polluted exhaust gases are adapted to flow from the exhaust ports of the manifold through the extreme upstream portion of the exhaust or tail pipe T and into the "Exhaust Gas-Secondary Air Entrainment Region" of the afterburner. The afterburner may be expeditiously secured to the exhaust pipe T of an existing automobile engine system by cutting the pipe and sliding a first tubular shaped unit 15 in surrounding and substantial sliding fit engagement therewith. Positive securance therebetween may be readily achieved by selectively tightening a conventional band type compression clamp 16.

A second tubular shaped unit 17 is subsequently operatively coupled to the first unit 15 in a similar manner, that is, by sliding the extreme upstream portion thereof over the extreme downstream portion of the extended unit 15 and by subsequently tightening a standard band type clamp 18 thereon. The extreme downstream portion of the unit 17 may then be conveniently constructed and arranged in attaching relationship to a downstream portion of the tail pipe T, for example, and positively secured thereto by means of a standard band type clamp 19. Suitable adapter units or intermediate conduits may be employed between these segments depending on the particular installation. It should be further noted that a conventional insulation noted by the dotted lines D may be selectively formed on the exterior of the afterburner 1 if so desired.

The "Exhaust Gas-Secondary Air Entrainment Region" comprises a first passage means terminating in a Venturi type portion including a restricted throat section 20 operatively connected to said engine for receiving the polluted exhaust gases therefrom. Such a restricted throat portion is constructed and arranged to function in a Venturi type manner, i.e., to increase the relative speed of the subsonically flowing gases to thus cause a relatively low pressure region thereat. A secondary air entrainment opening 21, preferably exposed to an ambient environment, is formed in a side wall portion of the member 15 by means of a necked-in section 22. It should be noted that during most phases of engine operation, the pressures occasioned at the throat section 20 will be less than that of the ambient environment which environment approximates 14.7 p.s.i.a. Such a relatively low pressure region (adjacent throat section 20) functions to automatically cause the entrainment of secondary air during most phases of engine operation, as will be hereinafter more fully explained.

The necked-in section 22 may be formed by conventional stamping methods, for example, and may be subsequently formed as an integral part of the unit 15 by conventional welding techniques or the like. The necked-in section 22 not only functions to provide the secondary air opening 21, but further functions to form the restricted throat portion 20 as more clearly shown in FIG. 4. The necked-in portion 22, comprising the secondary air opening 21, is constructed and arranged to project interiorly of the unit 15 and face inwardly and downstream, as shown in FIG. 3. The secondary air which is thus guided into the interior of the unit 15, functions to form a primary mixture with the polluted exhaust gases and the gaseous crankcase vapors. The relative dimensions, construction and arrangement of the passages 20 and 21 comprise a matter of design depending on the secondary airpolluted exhaust gas ratio desired. For example, the entrance to the necked-in portion 22 as shown in FIG. 3 may be constructed and arranged to extend closely adjacent to a conventional radiator cooling fan F (FIG. 2) of the engine to aid in the increase of ambient static pressure thereat to thereby increase the quantity of secondary air inducted into the system.

As clearly shown in FIG. 4, the preferred cross-sections of the openings 20 and 21 comprise substantial crescent and ovoidal configurations, respectively. Such configurations function to discharge the secondary air into the polluted cases with a substantial swirling action, thus providing for increased turbulence. A further increase in the swirling and mixing actions imparted to the primary mixture may be provided by means of vanes or the like strategically constructed and arranged within preselected interior portions of the afterburner. Such enhanced mixing, i.e., swirling, may be imparted to the primary mixture anywhere within the mixing or combustion regions.

The conduit 2, which forms one basic portion of a secondary air regulating means, aids in the automatic control of secondary air induction during particular conditions of engine operation. As hereinbefore stated, the relatively low pressure region created adjacent to the throat section 20 is primarily responsible for the induction of secondary air. However, during particular critical stages of engine operation the relatively low pressure created in the throat region 20 is not sufficient to induce the desired amounts of secondary air therein. Therefore, the secondary air control means, alternatively herein noted as a regulating means, aids the relatively low pressure region created by throat section 20 in the inducement of additional secondary air during such critical stages of engine operation. The operational functions primarily afforded by the restrictive throat section 20 and the hereinafter more particularly described conduit 2 combination will be hereinafter termed the overall functions of a control means or entraining means.

As hereinbefore stated, the conduit 2 is operatively connected at 4 (FIG. 2) to the intake manifold M of the engine to sense and transmit the continuously changing pressures occasioned therein. The conduit 2 is secured by means of the standard fitting 3 to a secondary air control chamber 23 which is formed as an integral part of the unit 15. An exit orifice 5 of the conduit 2 terminates in the chamber 23 and is constructed and arranged closely adjacent to the secondary air entrainment opening 21 and restricted throat section 20. With such a construction and arrangement it should be readily noted that the prevalent pressure, particularly around the secondary air opening 21, is directly varied in accordance with the pressure sensed in said intake manifold. Thus, during particular phases of engine operation, the secondary air is automatically induced and discharged through the throat section 20 in accordance with the performance of said engine. The hereinafter set forth analysis more fully explains the theoretical purpose for the aerodynamic secondary air control means, and in particular the regulating means essentially comprising the conduit 2 which is included therein.

Figure 5:
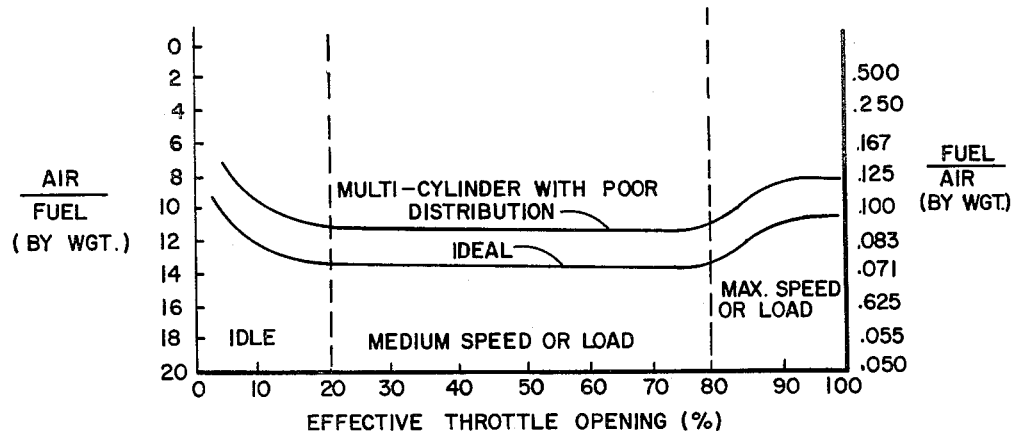
FIG. 5 is a graphical showing of a representative carburetor performance curve.

FIG. 5 discloses a representative performance curve depicting the performance characteristics of a carburetor adapted for use with a conventional internal combustion type engine such as those used in automobiles, for example. The performance curve was obtained from page 296 of the book "Internal Combustion Engines" published by Jennings and Obert in August 1945. From this figure it can be readily inferred that the richest fuel/air mixtures are provided in the idling and low r.p.m.—low load range. The next richest mixtures are provided in the high r.p.m.—high load range. It should be particularly noted that in the low r.p.m.—low load range of operation, the percentages of unoxidized and partially oxidized carbons and hydrocarbons increase to a maximum of about 20% of the fuel flow rate, especially under conditions of rapid deceleration. In the high r.p.m.—high load range the percentages are approximately 10% of the fuel flow rate.

The percentages of unoxidized and partially oxidized carbons and hydrocarbons, relative to the total exhaust gas flow, remain approximately constant in the range of r.p.m. and/or power from about 20–80% of maximum. As the r.p.m. and/or power increases, the rate of exhaust gas flow and hence the rate of flow of the unoxidized and partially oxidized carbons and hydrocarbons have an approximately linear increase. Thus, the necessitated amount of secondary air to be mixed with the polluted exhaust gas flow for purposes of oxidation must also maintain a substantial linear increase.

The purpose of the Venturi type function afforded by throat section 20 is to provide the necessary secondary air flow for the conditions outlined above. In the ranges of low r.p.m.—low load, and high r.p.m.—high load, additional secondary air will be automatically provided through the secondary air inlet 21 primarily by means of the relatively low pressure region created at throat section 20.

As hereinbefore stated, the principal function of the Venturi type section 20 is to cause ambient secondary air to be forced through the throat section 21 by means of the pressure differentials existing (under engine operating conditions) between the static pressure of the exhaust gases in the throat section and the static pressure of the ambient air surrounding the system. It is desired that the Venturi section be so designed to insure that the static pressure closely adjacent thereto is at all times lower than that of ambient static. Because the drop in pressure between the upstream portion and the immediate throat section 20 of the Venturi is a direct function of the exhaust gas flow, which in turn is a direct function of the engine power output and/or r.p.m., the secondary air flow increases as the pressure differential between the ambient air static pressure and the throat static pressure increases. It is thus seen that at least in the range 20–80% of maximum power/maximum r.p.m. as more secondary airflow is required, more is automatically provided. However, during the other phases of engine operation, additional secondary air may be necessitated. The secondary air regulating means in the form of conduit 2 fulfills such a desired function.

In the 0–20% of maximum power/maximum r.p.m. ranges of engine operation (low load and/or low r.p.m.), the percentages of unoxidized and partially oxidized carbons and hydrocarbons present in the exhaust gas flow increase to a maximum of approximately 20% of the fuel flow rate. At these times the rates of exhaust gas flows are least and the pressures in the exhaust manifold are only slightly higher than ambient static. In accordance therewith, the drops in pressure at the throat section 20 of the Venturi are relatively low. Thus, the pressure differentials between the throat section 20 of the Venturi and the ambient air are also relatively low resulting in low mass flow rates of secondary air into the system (at conditions which require inordinately high rates). Such secondary air flow rates are generally lower than those required to obtain a combustible mixture with the exhaust gases.

In the 80–100% of maximum power/maximum r.p.m. ranges of engine operation (high load and/or high r.p.m.), the percentages of unoxidized and partially oxidized carbons present in the exhaust gases are again high, increasing to approximately 10% of the fuel flow rate depending upon the engine under consideration. For these conditions, the exhaust manifold pressures will trend toward a maximum. The drop in pressure between the exhaust manifold and the Venturi throat section 20 will also be high. However, the drop in the pressure from high manifold pressures may not be sufficiently high to obtain a pressure differential between ambient static and the throat section 20 of the Venturi which is sufficiently high to provide a sufficient secondary air flow to obtain a combustible primary mixture with the exhaust flow.

In addition, the condition of sudden deceleration of the engine from maximum r.p.m./maximum power to lower values, provides percentages of unoxidized and partially oxidized carbons and hydrocarbons in the exhaust gases which may exceed the 10–20% contamination previously mentioned.

The aerodynamic regulating means which aids secondary air entrainment automatically provides the necessitated additional secondary airflow during the aforestated critical conditions of engine operation, as outlined in the above three paragraphs. Additional aerodynamic regulation of the secondary air entrainment is provided by means of the intake manifold I and the operatively connected conduit 2. As hereinbefore stated, with such an arrangement the pressure adjacent the secondary air inlet 21 is directly varied in accordance with the pressure sensed in the intake manifold so that the induction of secondary air may be directly induced in accordance with the output of the engine.

During the 0–20% of maximum power/maximum r.p.m. range of engine operation, when the rates of exhaust gas flows are least and pressure differentials between the ambient air and the throat section 20 of the Venturi are low, an additional pressure differential is automatically imposed upon the secondary air inlet duct 21 by means of the intake manifold pressures. Additional secondary air is thus automatically entrained. It is important that the exhaust gases and the secondary air are not drawn into the intake manifold, which undesirable function might result in a rough-running engine and also might function to disrupt the desired combustible primary mixture. The solution to this problem primarily lies in the correct construction and arrangement of the secondary air inlet 21 relative to the chamber 23 and the opening 5 of the control means. When the conduit 2 is constructed and arranged relative to the baffle type recessed chamber 23 of the unit 15 as shown in FIG. 3, for example, the momenta of the secondary airflow and that of the polluted exhaust gases will be sufficiently great so that these gases are not drawn into the opening 5 of the conduit 2. Rather, such gases are swept downstream into the mixing and main combustion regions.

During the sudden deceleration condition of the engine operation, as described above, the same basic principles are utilized with the desired higher pressure differentials obtaining between ambient static and the Venturi restricted throat section 20. The relatively high momenta of the gas again primarily functions to prevent such gases from being drawn into the conduit 2.

For the range of engine operation of 80–100% of maximum power/maximum r.p.m., it is possible that pressures in the intake manifold may actually be higher than those in the Venturi throat section 20. Such a condition could conceivably cause a combustible fuel/air mixture to flow from the intake manifold into the Venturi throat region. Such a condition is not necessarily adverse. If the flow is sufficiently high, aerodynamic constriction of the exhaust gases and secondary air will be obtained thus, resulting in an increase in the contraction ratio between the Venturi throat section 20 and the exhaust flow area. Thus, the static pressure at the throat section will be further reduced and additional secondary airflow obtained by means of the increased pressure differential.

Figure 6:
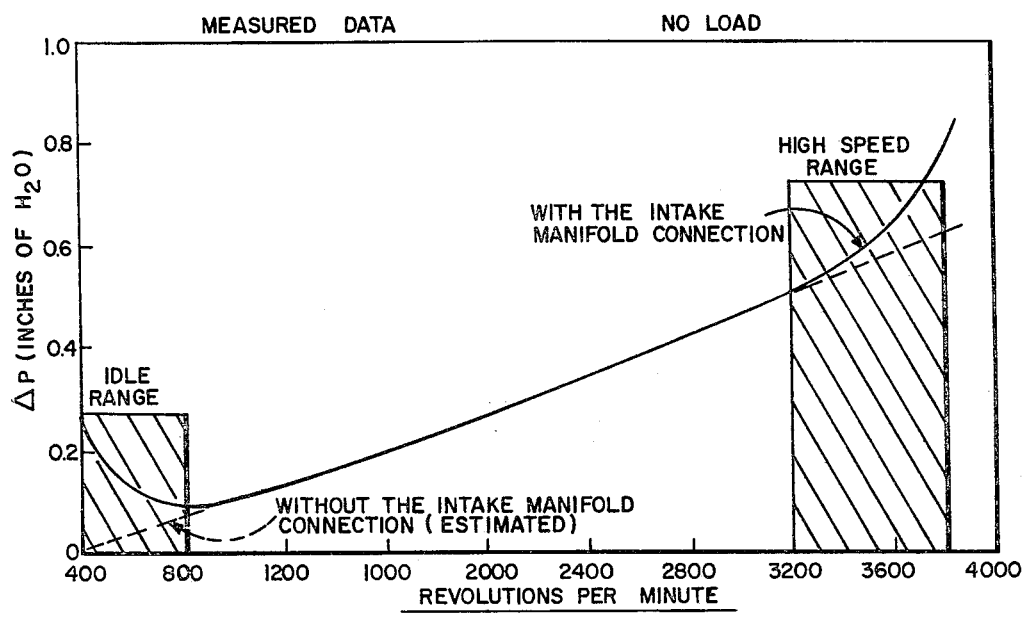
FIG. 6 is a graphical representation of secondary inlet pressure differential vs. r.p.m. of a conventional internal combustion type engine.

FIG. 6 graphically illustrates the above discussed conditions for a 1957 Ford V–8 engine having a displacement approximating 292 cu. in. The engine was maintained under "no-load" conditions for the duration of the testing thereof. The pressure differential ($\Delta p$), comprising the dynamic pressure of the secondary air flow, i.e., the difference in the total and static pressures therein, was plotted against the selectively varied r.p.m. of the engine. It should be particularly noted that the pressure differential ($\Delta p$) automatically increases a predetermined amount during the above discussed critical "idle range" and "high speed range" stages of engine operation due to the intake manifold connection. The dotted curve discloses an estimated plot of the $\Delta p$-r.p.m. ratios effected without the intake manifold connection. It should be further noted that since the mass flow of the secondary air is a direct function of its dynamic pressure, for an approximate constant temperature, it can be seen from the graph that additional secondary air is automatically provided as required.

Referring once again to FIG. 3, the second conduit 6 projects through an opening 7 formed in a second side wall portion of unit 15. It is preferred that the conduit 6 be in substantial press-fit relationship to the opening 7. As hereinbefore stated, a standard fitting may be alternatively utilized to provide a connection thereat. However, such a preferred press-fit type relationship would in most applications be sufficient to retain the conduit 6 in the desired relative stationary position.

As hereinbefore stated, the conduit 6 is operatively connected to the crankcase of the engine at one end thereof and is further constructed and arranged to project into the interior of the "Exhaust Gas-Secondary Air Entrainment Region" to inject gaseous type crankcase vapors therein. The operative connection to the crankcase may be expeditiously made at the crankcase breather pipe cap B (FIG. 2) by means of the standard fitting 8, for example. Since the pressures in the crankcase are substantially that of ambient or slightly higher, a desirable pressure differential normally exists between the interior of the crankcase and the region adjacent the restricted throat section 20 under all operational conditions of the engine. Such a state would normally exist since the primary mixture functions to travel at an extremely high rate of speed thus, creating a relatively low pressure region adjacent the exit opening 9 of the conduit 6. Such a low pressure region functions to automatically induce the crankcase vapors therein, thus, providing a combining thereof with the polluted exhaust gases and the secondary air. As shown in FIG. 3, to further aid in the inducement and mixing of the crankcase vapors, the exit opening 9 of the conduit 6 is constructed and arranged to face downstream in the unit 15.

The "Mixing Region" may conveniently comprise any desired length depending on a particular engine application with which the afterburner is utilized. As hereinbefore stated, such a desired function is afforded due to the fact that the three depicted "Regions" are virtually independent of each other for their operations. A plurality of conventional type flame arresters 24 are constructed and arranged at the extreme downstream portion of the "Mixing Region," for flash-back prevention purposes. The utilization of such flame arresters is optional and may not be required in many afterburner-engine applications. However, one or more of such flame arresting type devices may be conveniently employed primarily for safety purposes. As more clearly shown in FIG. 7, the flame arresters preferably comprise a wire mesh or screen configuration. The flame arresters are preferably constructed and arranged transverse relative to the passage formed at the downstream portion of the "Mixing Region." Such flame arresters may comprise a standard high-temperature resistant (3,000° F., for example) steel wire gauze type material or the like. The flame arresters may be fixedly secured to the interior of unit 15 by conventional fabrication technique. The primary function of the flame arresters 24 is to prevent undesirable retrograde or flash back of the flames generated in the "Main Combustion Region." Also, such flame arresters function to prevent premature ignition of an overly rich mixture, for example, which mixture might collect under particular conditions of engine operation. The number and specific arrangement of the flame arresters comprise a matter of choice depending on the specific afterburner-engine application.

The "Main Combustion Region" comprises a second passage means operatively connected to said first passage means by the "Mixing Region." A ceramic coating or tubing 25 is formed on or placed in the interior portions of the second passage means and is constructed and arranged to form a second Venturi type throat section 26. As more clearly shown in FIG. 8, the throat section 26 may be constructed and arranged to comprise a substantial crescent type configuration. The ceramic coating 25 is further constructed and arranged to form a tube like main combustion chamber or zone 27 and a preburner chamber or zone 28. The combustion chamber 27 and the throat section 26 are preferably constructed and arranged to assure that combustion of the entering primary mixture proceeds to completion before discharge therefrom. The ceramic inner liner may comprise any standard firebrick type material which may be conveniently formed into the desired configurations by conventional casting or spraying techniques. The utilization of such a firebrick type material, primarily due to its inherent surface combustion qualities, substantially aids in the continuous combustion of the primary mixture.

A preburning means, generally noted at 29, is constructed and arranged substantially radially exterior of the units 15 and 17 and is shown for illustration purposes as facing in a relative upstream direction. However, it may be directed in any desired direction depending on the particular afterburner-engine design requirements. An opening 30 is formed therein and is exposed to an ambient environment. The opening 30 functions to receive and transmit tertiary air to the preburner chamber 28. The preburner chamber 28 terminates in a third restricted throat type section or opening 31 at the extreme downstream portion thereof. Such an opening functions to aid in the inducement of the tertiary air flow. However, it should be noted that the induction of tertiary air is primarily dependent on the relatively low pressures prevalent adjacent to the restricted throat section 26.

To provide a preburning medium having a sufficiently high energy to assure complete combustion of the primary mixture during all phases of engine operation, the preburning means 29 functions to automatically supply predetermined quantities of energy to the primary mixture in accordance with the temperature generated, for example, when said primary mixture is burned. The energy which is selectively and automatically added to the primary mixture comprises a combustible tertiary air-secondary fuel mixture obtained from the opening 30 and secondary fuel line 10, respectively. Such a mixture will be herein termed a secondary mixture. Such a secondary mixture can be readily ignited by means of a conventional relatively low-voltage type glow or spark plug means 32 which is preferably operatively secured to a conventional type battery (schematically illustrated in FIG. 1) and in series with the engine ignition system of the automobile.

To aid in this function the fuel line 10 comprising a third conduit is extended through an aperture 11 formed in a side wall portion of the unit 17 and the ceramic coating or tube 25, as shown. The conduit 10 is constructed arranged to extend in an upstream direction in substantial abutting relation with the ceramic coating means 25. The conduit 10 terminates in a conventional type injector ring 13 constructed and arranged closely adjacent to the tertiary air opening 30 formed in the preburning means. A plurality of orifices 14 are formed in the injector ring and are constructed and arranged to face the preburning chamber 28. The specific number, size and relative positioning of the orifices comprises a matter of choice depending on the particular application. For example, it is desirable in many applications to selectively orientate at least some of the orifices 14 so as to direct the secondary fuel spray into the longitudinal flow axis (not shown) of the tertiary air. As hereinbefore stated, the second end of the conduit 10 may be operatively connected to a fuel pump P (FIG. 2) in order to transmit pressurized fuel therethrough in accordance with the action of said pump.

Although FIG. 3 discloses the secondary fuel conduit 10 as being juxtaposed to both the main combustion chamber 27 and preburner combustion chamber 28, attention is drawn to FIG. 9 wherein an alternative embodiment thereof is shown. FIG. 9 discloses a secondary fuel conduction conduit 37 which is constructed and arranged to extend through and in substantial press-fit relationship with an aperture 38 formed in the ceramic inner liner 25 and the unit 17. Whereas the conduit 10 of the FIG. 3 embodiment is constructed and arranged to extend in juxtaposed relationship to both the main combustion chamber 27 and the secondary combustion chamber 28, the conduit 37 of the alternative embodiment of FIG. 9 is constructed and arranged to extend in juxtaposed relationship to only the secondary chamber 28. Such a rearrangement of the secondary inlet conduit is a matter of choice and design depending on the magnitude of temperatures which are needed to afford the hereinafter explained vapor-lock function.

Figure 10:
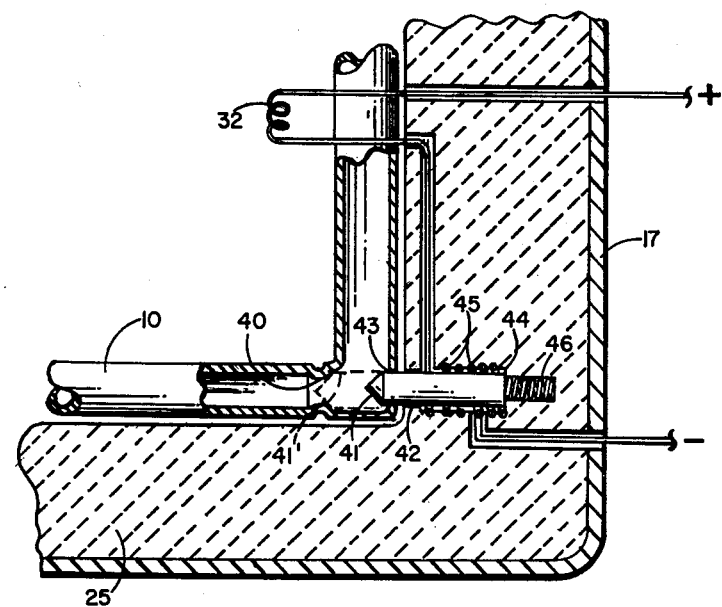
FIG. 10 is a partial cross-sectional view of a secondary fuel cut-off device which may be utilized with the first preferred afterburner embodiment.

A secondary fuel cutoff mechanism is disclosed in FIG. 10 and may be utilized to substantially stop the flow of secondary fuel, if desired, should electrical ignition fail. Such a function might be desirable, for example, should the battery of an automobile fail at which time the flow of secondary fuel into the preburning chamber 28 should be substantially stopped to prevent the collection of a highly rich mixture therein. The secondary fuel conduit 10 may be selectively fabricated to comprise an inwardly and circumferentially extending bead portion 40 which portion is adapted to function as a seat for the conically shaped seat portion 41 formed on the leading end of a cylindrically shaped plunger member 42. The plunger member 42 is constructed and arranged to project through an aperture 43 formed in the conduit 13 and is slidingly housed in a cylindrically shaped cutout portion 44 formed in the ceramic inner liner 25. A solenoid coil 45 is constructed and arranged around the plunger member 41 and is positively retained in the cutout portion 44 by conventional fabrication techniques. The solenoid coil 45 is operatively connected in series to the ignition element 32 and is adapted to retain the plunger member 42 in the retracted position shown in FIG. 10 when battery power is transmitted to the ignition element 32. A coil spring member 46 of the compression type is constructed and arranged in the cutout portion 44 and is adapted to urge the plunger member 42 toward the seat portion 40. When the power transmitted to the ignition element 32 is cut off, the spring member 46 functions to urge the conically shaped seat portion 41 against and in substantial sealing relationship with the seat portion 40 as shown by the dotted lines 41. With such an exemplary secondary fuel cut-off type mechanism, it is obvious that possible damage to the afterburner system is prevented.

The hereinbefore explained preburning system provides that should the primary mixture, which is continuously entering the main combustion chamber 27 be sufficiently rich in unoxidized and partially oxidized carbons and hydrocarbons to assure upon oxidation, predetermined afterburner temperatures, additional energy from the preburning means 29 is not needed. Steady-state combustion will be continuously maintained during such a condition and energy from the preburning means 29 will not be added to the primary mixture. However, should the percentages of unoxidized and partially oxidized carbons and hydrocarbons in the primary mixture be lower than that required to raise the temperature thereof up to the required auto-ignition temperature, additional energy is automatically supplied to the primary mixture by means of the aforedescribed preburning means 29.

The following discussion is set forth to more fully elucidate the novel theoretical functions of the preburning means. As hereinbefore stated, the preburning means 29 automatically functions to assure a sufficiently high energy addition to the primary mixture so that complete combustion thereof occurs during all phases of engine operation. Also, as previously stated, the exhaust gases of internal combustion engines contain unoxidized and partially oxidized carbons and hydrocarbons in amounts depending upon the r.p.m. and the load of the engine, the carburetor and ignition system design and settings, the particular design of the engine proper, the efficiency of operation of the engine proper, and the efficiency of the engine design itself. Thus, given two engines of identical design, r.p.m. and load one of such engines may deposit twice as many "unburneds" into the exhaust gases as the other. All internal combustion engines, however, go through particular regimes of established operation in which the percentages of "unburneds" are higher than in other regimes. Further, in order to achieve complete oxidation of the unoxidized and partially oxidized constituents not only is a combustible fuel-air mixture ratio necessary (in the case of vitiated air this requires an overly-lean mixture ratio) but also an ignition source must be present to initiate combustion to provide sufficient energy whereby the remaining fuel-air mixture is heated to its ignition temperature. Furthermore, the combustion chamber must be of such size as to permit combustion to go to completion before the reacting constituents are discharged therefrom. It has been determined that the minimum temperature for substantial instantaneous oxidation of all the hydrocarbons and carbon monoxides typically present in the vitiated exhaust gases approximates 1800° F. It has also been determined that the amount of heat theoretically afforded by complete combustion of hydrocarbons and carbon monoxides is not sufficient during approximately 50% of the engine's operation to raise the temperature level of the primary mixture up to the desired 1800° F.

Thus, some additional energy must be supplied either electrically or by fuel from the carburetor or the fuel pump. Owing to the fact that an internal combustion engine of the conventional type operates at approximately 25% thermal efficiency, the amount of fuel necessary per unit time to be supplied to the carburetor to afford delivery of a predetermined number of electrical units of heat power approximates four times the amount of fuel required to deliver the same amount of heat power if the fuel were delivered directly to the afterburner. This may be directly translated into a decrease in miles per gallon of the automobile or truck, the decrease in the fuel heating case being approximately one-fourth that of electrical heating. It is estimated that approximately ½–2 m.p.g. decrease may occur with the more efficient of the energy addition systems. Some engines which run particularly dirty, i.e., high percentages of "unburneds" in the exhaust gases, may not decrease their miles per gallon. However, in this case, the fuel penalty has already been paid by utilizing a relatively inefficient engine.

To cope with such a problem, the preburning means of this invention has been conceived. This system is designed to be automatic in its operation, self-regulating in its control of afterburner temperatures, and substantially void of moving parts. Another novel feature of the preburning means is the inherent vapor-lock system included therein which system functions to maintain afterburner temperatures at their required estimated value of approximately 1800° F.

As hereinbefore stated, the secondary fuel inlet conduit 10 functions to receive liquid fuel from the fuel pump P (FIG. 2). The fuel which is transmitted therethrough vaporizes in an amount proportional to the average temperature difference between the afterburner and the liquid and also, but less dependent, in accordance with the overall heat transfer coefficient between the gas side (outer wall) of the heated tube and the liquid fuel side (inner wall) thereof. For example, if the temperature of the afterburner should exceed the required 1800° F., the rate of fuel vaporization within fuel conduct 10 will increase and the amount of pressure drop between the outlet of the fuel pump P and the secondary fuel outlet 13 will increase. Conversely, the rate of mass flow of the fuel will decrease as graphically illustrated in FIG. 11. Finally, when the pressure in the fuel tube increases beyond a predetermined level, primarily governed by the particular design of the fuel pump, the rate of fuel pumping approaches zero. Choking flow of the fuel vapors, if reached at the orifices 14 of the injector ring 13, will provide closer mass flow control of the secondary fuel. Such a choked flow condition occurs when the fuel vapors at the orifices 14 of the injector 13 approximates Mach one and functions to subject the fuel pump P to extremely closely regulated back pressures in the same manner as above discussed.

Suitable secondary fuel inlet conduit 10 construction and arrangement establishes proper operating conditions so that a particular combustion chamber average temperature may be maintained under all conditions of engine operation. For example, the relative wall thickness and the particular material utilized for the secondary fuel inlet conduit 10 comprise the prime design factors to be considered in providing for the desired heat transfer coefficient. It should be noted that the injector ring 13 may be constructed and arranged within the main combustion zone 27, closely adjacent to the restricted throat portion 26, to directly deliver fuel therein (as hereinafter explained, for example, in connection with the FIGS. 12–15 inclusive embodiment). However, the utilization of a tertiary air-secondary fuel mixture for a preburning medium would appear advantageous for most afterburner applications. Also, it may be desirable in many afterburner applications to dispense with the injector ring 13 and merely bend that portion of tube 10 which terminates adjacent to the tertiary air inlet 30 in a downstream direction, thus providing only one orifice for the induction of secondary fuel.

Figure 12:
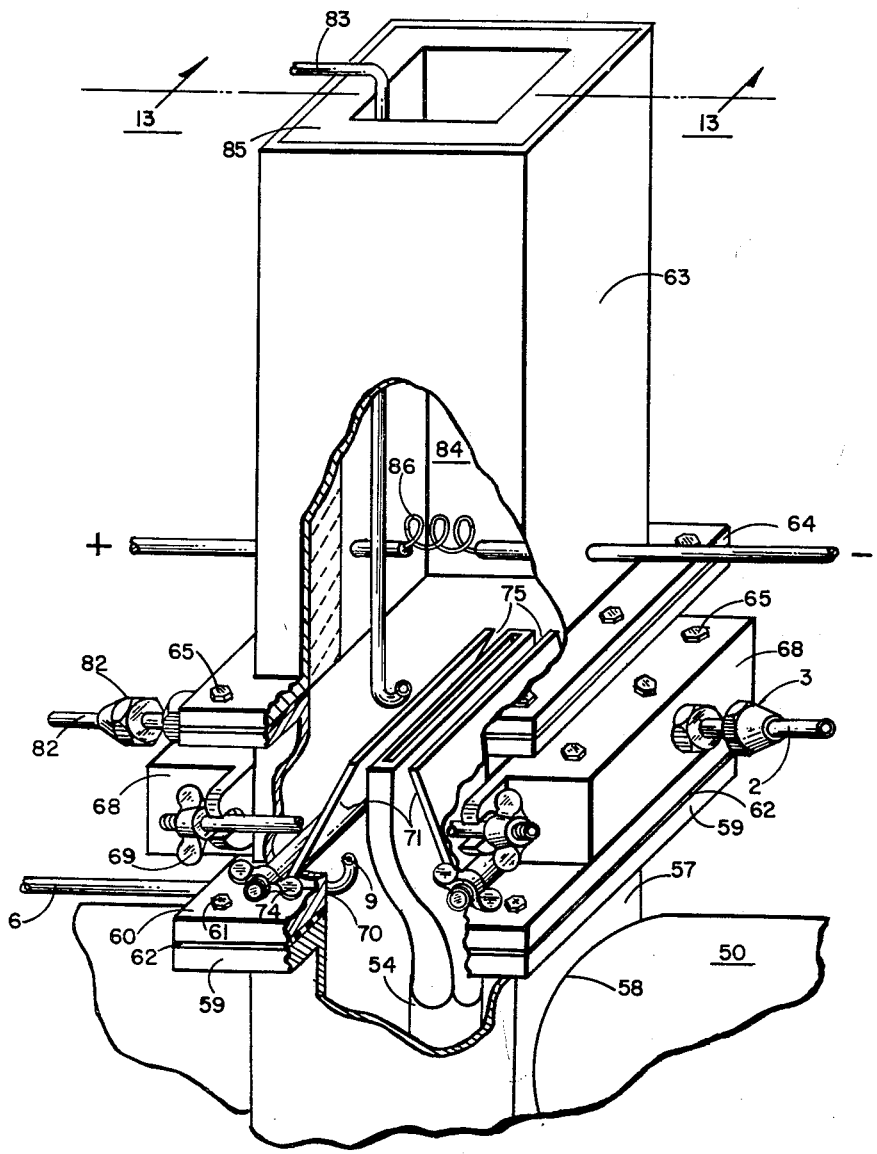
FIG. 12 is an isometric, partially sectioned view of a second experimental type embodiment employing the basic novel concepts of this invention.

FIGS. 12–15 inclusive, disclose a second embodiment, basically of the experimental type, employing the novel concepts of this invention. Referring now more particularly to FIGS. 12 and 13 a conventional exhaust manifold 50 is adapted to receive polluted exhaust gases discharged through ports 51 (FIG. 13) which ports are operatively integral with an internal combustion type engine in the conventional manner. An end plate 52 is secured to the intake manifold by means of bolts 53 and functions to form a sealing action thereat by means of a conventional gasket member 54. In the majority of afterburner-engine applications this particular portion of the exhaust manifold would be attached to the afterburner which would in turn be operatively connected to a standard tail pipe. However, to facilitate experimental changes and the like the afterburner system is shown as mounted on the top portion of the exhaust manifold 50.

Secondary air is induced into the system by means of a preferably cylindrically shaped inlet conduit or tube 54 which is projected upwardly through and in substantial press-fit relationship with a hole 55 formed in the exhaust manifold. The conduit terminates in a diverging passage portion 56 which functions to discharge the induced secondary air into the polluted exhaust gas to thus form a primary mixture therewith. As more clearly shown in FIG. 12, the passage portion 56 preferably comprises a "vacuum cleaner head" type configuration. Such a configuration assures substantial distribution of the exhaust gases for mixing purposes. An upstanding bracket member 57 is secured to the exhaust manifold by means of a weld bead 58, as shown. Other type conventional securance means may be utilized in lieu thereof if so desired. A flange portion 59 of the upstanding bracket member 57 is substantially square in cross-section and functions to have an intermediate member 60 secured thereto by means of a preselected number of bolts 61. Sealing means 62, in the form of a standard gasket, may be provided to prevent lateral flow of the polluted exhaust gases which exit thereby.

Figure 14:
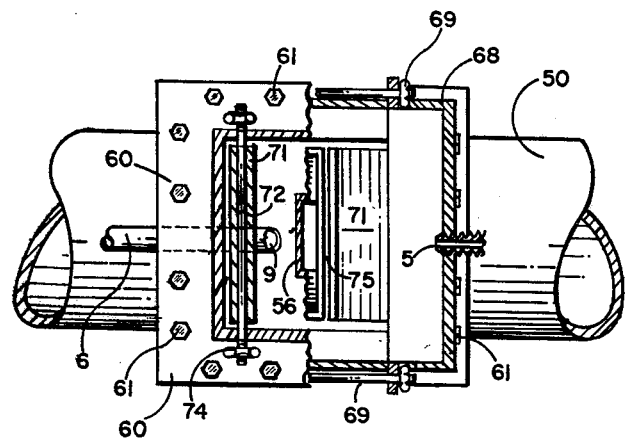
FIG. 14 is a cross-sectional view taken on lines 14—14 of FIG. 13.

A third upstanding member 63 is secured to a flange portion 64 of the second member by means of bolts 65. A third gasket type member 66 of the conventional type may be utilized to prevent radial flow of the gases which flow thereby. As more clearly shown in FIG. 13, the intermediate member 60 has two substantially juxtaposed ports 67 formed in two opposing side wall portions thereof. Head members 68 function to enclose the ports 67 by means of two standard compression clamp assemblies 69 of the conventional type (FIG. 14).

The conduit 6, which is operatively connected to the crankcase of the engine in order to receive polluted vapors therefrom, is projected through a hole 70 formed in a side portion of the member 57. Two shutter type members 71 are preferably press-fitted onto rotatable shafts 72 which are rotatably mounted in bearing holes 73 formed in the upstanding intermediate member 60. As more clearly shown in FIG. 14, the shafts 72 may be selectively rotated to adjust the shutter type members 71 from the exterior of the afterburner device by means of a butterfly type knob 74. Such an adjustable means makes possible the selective formation of a venturi type throat passage 75 which passage functions to induce controlled flow of the polluted exhaust gases.

Conduit 2 is operatively connected to the intake manifold of the engine in the same manner as hereinbefore explained in connection with the hereinbefore described embodiment of FIG. 3. The outlet 5 of the conduit 2, comprising the aerodynamic control for secondary air entrainment, is constructed and arranged to cooperate with an inner chamber 80 formed by one of the head members 68 (FIG. 13) to thereby transmit the varying intake manifold pressures thereto. If so desired, a second conduit 81 may be operatively connected by a conventional coupling means 82 to the chamber 80 formed in the second head member 68 to provide for an increased sensing function. With such a construction and arrangement the polluted exhaust gases, the secondary air induced through conduit 54 and the crankcase vapors injected into the afterburner device by means of conduit 6 form a primary mixture in much the same manner as that disclosed in connection with the first hereinbefore described embodiment.

A secondary fuel conduit 83 is operatively connected to the hereinbefore described conventional type fuel pump P (FIG. 2) and is projected downwardly and terminates adjacent the restricted throat portion 75. The secondary fuel conduit 83 functions to inject predetermined amounts of fuel therein when the primary mixture does not contain a sufficient amount of unoxidized and partially oxidized carbons and hydrocarbons to maintain continuous and steady state combustion in a combustion chamber 84. A ceramic inner liner 85 is preferably formed of a material similar to the ceramic type material comprising the inner liner 25 of the FIG. 3 embodiment. The inner liner 85 is constructed and arranged to form the combustion chamber 84 and functions to insulate and also functions to aid in the continuous combustion of the primary mixture. To initiate combustion, an ignition means 85 is constructed and arranged in the chamber 84 as more clearly shown in FIG. 15.

From the above description of the FIGS. 12–15 embodiment it is apparent that the only basic difference from the FIG. 3 embodiment is the lack of a relatively sophisticated preburning means therein. The secondary fuel conduit 83, however, can be broadly construed as comprising a preburning means for automatically insuring a preburning medium having sufficient energy to assure complete combustion of the primary mixture during engine operation. Such a statement would appear correct since the fuel released into the combustion zone 84 by means of secondary fuel conduit 83 immediately forms a highly energized mass functioning to maintain steady state combustion therein during all modes of engine operation. The other basic functions thereof are substantially similar to those hereinbefore set forth in connection with the first described embodiment. It should be particularly noted that the FIGS. 12–15 inclusive embodiment also provides an "Exhaust Gas-Secondary Air Entrainment Region," a "Mixing Region" and a "Main Combustion Region."

A brief description of the operational workings of the FIGS. 12–15 inclusive embodiment is hereinafter set forth. Secondary air is transmitted through conduit 54 and mixes with the polluted exhaust gases discharged from the exhaust manifold adjacent the restricted throat portion 75. The crankcase vapors injected into the system by means of conduit 6 are also mixed with the polluted exhaust gases to form the desired primary mixture. Aerodynamic control for automatically aiding in the inducement of the correct amounts of secondary air, at the hereinbefore described critical phases of engine operation, is provided by means of the hereinbefore described conduits 2 and 80 which conduits are operatively connected to the intake manifold of the engine.

The primary mixture subsequently progresses into the combustion zone 84 and is subjected to the ignition means 86 for burning purposes. The primary mixture is thus efficiently burned and the final product comprises a substantially unpolluted exhaust gas. The secondary fuel conduit 83 incorporates the hereinbefore discussed vaporlock principles and functions to automatically supply predetermined amounts of fuel to the primary mixture when needed.

Although this invention has been described and illustrated in detail, it is to be understood that the same is by way of illustration and example only and is not to be taken by way of limitation, the spirit and scope of this invention being limited only by the terms of the appended claims.

I claim:

1. In an afterburner which is operatively connected to an internal combustion type engine, said engine having an intake manifold for inducing primary air therein in accordance with the varying pressures occasioned by the output of said engine, said afterburner having control means comprising first means for receiving combustion gases from said engine and for inducing and discharging secondary air into said combustion gases and second means operatively connected to said intake manifold and further operatively connected to said afterburner to provide fluid communication therebetween for directly varying the pressure downstream of said first means.

2. An afterburner in combination with an internal combustion type engine having an intake manifold means operatively connected thereto for introducing primary air therein, said afterburner operatively connected to said engine downstream thereof for receiving exhaust gases therefrom and comprising entrainment means for receiving said exhaust gases therein and for inducing secondary air into said exhaust gases to form a mixture therewith, said entrainment means including an opening exposed to said secondary air and means in fluid communication with said intake manifold means and said entrainment means for directly exposing a region in said entrainment means to the pressures in said intake manifold, and burning means operatively connected to said entrainment means downstream thereof for burning said mixture during engine operation.

3. In an afterburner operatively connected to an engine of the internal combustion variable output type, said engine having an intake manifold operatively connected thereto, said afterburner comprising a passage means having a restricted throat portion formed therein, said passage means having an opening formed in a first side wall portion thereof and means in fluid communication through a second side wall portion of said passage means and in fluid communication with the intake manifold of said engine for automatically and directly varying the pressure around the opening formed in said first side wall portion in accordance with the output of said engine.

4. In an afterburner which is operatively connected to an internal combustion engine downstream thereof, said engine having an intake manifold operatively connected thereto for receiving primary air therein in accordance with the varying pressures occasioned by the output of said engine, said afterburner comprising an entrainment means, a mixing means and a combustion means, said entrainment means comprising control means for receiving exhaust gases from said engine and for inducing and mixing secondary air therewith in predetermined proportions to form a primary mixture, said control means including entrance means for permitting the flow of secondary air therein and regulating means operatively connected to said intake manifold and to said afterburner for varying the pressure around said entrance means in accordance with the pressure in said intake manifold, said mixing means being operatively connected to said entrainuing means downstream thereof for efficiently mixing said exhaust gases and said secondary air, said combustion means operatively connected to said mixing means downstream thereof for burning said primary mixture, said combustion means comprising means for automatically adding energy to said primary mixture to thereby assure substantial constant burning of said primary mixture during engine operation, the energy addition afforded by said means being dependent on the temperature level prevalent when said primary mixture is burned in said combustion means.

5. The invention of claim 4 further comprising flame arresting means constructed and arranged in said mixing means for preventing upstream movement of flames generated in said combustion means.

6. An afterburner operatively connected to an internal combustion engine downstream thereof, said afterburner comprising a first passage means operatively connected to said engine for receiving unburned products of combustion therefrom, said first passage means having a necked orifice means formed in a first side wall portion thereof for receiving secondary air therein to form a mixture with said unburned products of combustion, said necked orifice means constructed and arranged to project interiorly of said first passage means and facing inwardly and downstreamwardly to provide a restricted throat portion in said first passage means, first conduit means operatively connected at a second side wall portion of said first passage means adjacent said restricted throat portion and further operatively connected to a crankcase of said engine, pressure sensing second conduit means operatively connected to said first passage means and in fluid communication with an intake manifold of said engine to sense the pressure therein, a second passage means operatively connected to said first passage means downstream thereof for receiving said unburned products of combustion-secondary air mixture from said first passage means, a preburner chamber means operatively connected to a first side wall portion of said second passage means, said preburner chamber means forming a chamber terminating at a first end thereof in a first opening constructed and arranged to face upstream radially exterior of said first passage means for receiving tertiary air therein, said preburner chamber means terminating at a second end thereof in a second opening constructed and arranged to face downstream in said second passage means, ceramic coating means coated on the interior portions of said second passage means and said preburner chamber means, ignition means constructed and arranged in said preburner chamber means and automatic fuel addition means comprising a third conduit formed through a second side wall portion of said second passage means and said ceramic coating means downstream of the first side wall portion thereof, said fuel addition means constructed and arranged to extend upstream in abutting relation to said ceramic coating means and terminating at a first end thereof at the first opening of said preburner chamber means and having a second end thereof operatively connected to a fuel source, said third conduit having a vapor lock means therein whereby the flow of fuel in said third conduit is automatically regulated in conformance with the temperatures generated in said second passage means.

7. An afterburner for receiving and burning polluted exhaust gases discharged from an internal combustion engine, said afterburner comprising a restricted throat portion for receiving said exhaust gases, a first opening formed in said afterburner adjacent to said restricted throat portion for permitting the entrance and mixing of secondary air with said exhaust gases, a second opening in said afterburner downstream of said first opening and in pressure communication with an intake manifold of said engine, combustion chamber means operatively connected to said restricted throat portion and fuel addition means in operative arrangement with said combustion chamber means for adding predetermined amounts of fuel therein depending on the temperature level afforded by combustion of said exhaust gas-secondary air mixture in said chamber means.

8. In a method for efficiently burning exhaust gases discharged from an internal combustion type engine having an intake manifold for inducing primary air therein, the steps comprising: inducing the flow of said exhaust gases, discharging predetermined amounts of secondary air into said exhaust gases to form a mixture of predetermined proportions therewith, and varying by fluid communication the pressures where said secondary air is discharged into said exhaust gases in accordance with varying pressures in said intake manifold for discharging said secondary air into said exhaust gases in direct relation therewith.

9. The invention of claim 8 further comprising the steps of burning said mixture, adding predetermined amounts of fuel and air to said mixture to maintain the burning thereof and automatically regulating the addition of said fuel when the temperature of burning reaches a predetermined level.

10. A method for efficiently burning the HC, NO and CO constituents present in exhaust gases discharged from an internal combustion type engine having an intake manifold for inducing primary air therein, comprising the steps of inducing the flow of said exhaust gases, discharging predetermined amounts of secondary air into said exhaust gases to form a mixture of predetermined proportions therewith, directly transmitting the varying pressures in said intake manifold to where said secondary air is discharged into said exhaust gases, directly regulating the discharging of said secondary air into said exhaust gases in accordance with the pressures in said intake manifold, adding predetermined amounts of energy to said mixture, burning said mixture during engine operation, and automatically stopping the addition of energy when the temperature of burning reaches a predetermined level.

11. An afterburning device operatively connected to an internal combustion engine downstream thereof, said device comprising entraining means for receiving expelled combustion gases from said engine and for inducing secondary air from a surrounding environment into said combustion gases to form a mixture thereof, and combustion means downstream of said entraining means for burning said mixture, said combustion means comprising vapor lock means for automatically regulating the flow therein in accordance with the temperature level afforded by the burning of said mixture and means for automatically inducing predetermined quantities of tertiary air into said preburning means for assuring a fuel tertiary-air mixture of predetermined relative proportions during predetermined phases of engine operation.

12. An afterburner operatively connected to an internal combustion engine comprising: first venturi means for inducing a combustion gas-secondary air primary mixture of predetermined relative proportions therein, means for burning said primary mixture, preburning means included in said means for burning including fuel addition means for automatically supplying predetermined quantities of fuel thereto in accordance with a temperature generated by combustion of said primary mixture, second venturi means for automatically inducing predetermined quantities of tertiary air into said preburning means for assuring a fuel-tertiary air secondary mixture of predetermined relative proportions, means for selectively igniting said secondary mixture and means for stopping the supply of said fuel when said means for igniting is rendered inoperative.

13. In an afterburner operatively connected to an internal combustion type engine, first means for inducing a combustion gas-secondary air primary mixture of predetermined relative proportions therein and second means for burning said primary mixture, preburning means included in said second means including means for automatically inducing predetermined quantities of tertiary air into said preburning means for assuring a fuel-tertiary air secondary mixture of predetermined relative proportions and fuel addition means having vapor lock means therein for automatically regulating the flow of fuel therethrough in conformance with the temperature generated in said fuel addition means.

14. The method of controlling combustion of exhaust gases in a combustion chamber of an afterburner comprising mixing fuel with said exhaust gases, igniting the mixture of fuel and exhaust gases and utilizing heat of said combustion for vaporization of said fuel to cause vapor lock that decreases fuel flow at a predetermined temperature in said chamber.

15. Apparatus for controlling combustion of a fluid comprising a combustion chamber for receiving said fluid, a source of secondary fuel connected to said chamber, means for igniting gases in said chamber, and means for employing vaporization of said secondary fuel to control the flow thereof, said last mentioned means comprising means for transmitting heat to said secondary fuel to cause vapor lock that decreases flow of said secondary fuel.

References Cited in the file of this patent

UNITED STATES PATENTS

| | | |
|---|---|---|
| 1,605,484 | Thompson et al. | Nov. 2, 1926 |
| 1,839,880 | Hyatt | Jan. 5, 1932 |
| 1,847,506 | White | Mar. 1, 1932 |
| 2,203,554 | Uhri et al. | June 4, 1940 |
| 2,447,124 | Kalitinsky et al. | Aug. 17, 1948 |
| 2,829,731 | Clayton | Apr. 8, 1958 |
| 2,864,960 | Von Linde et al. | Dec. 16, 1958 |
| 2,880,079 | Cornelius | Mar. 31, 1959 |
| 2,887,845 | Hagen | May 26, 1959 |
| 2,953,898 | Cornelius | Sept. 27, 1960 |
| 2,956,865 | Williams | Oct. 18, 1960 |